United States Patent
Naimpally

[11] Patent Number: 5,278,649
[45] Date of Patent: Jan. 11, 1994

[54] METHOD AND APPARATUS FOR TRANSMISSION OF SIGNALS FOR AN EXTENDED DEFINITION TELEVISION SYSTEM

[75] Inventor: Saiprasad V. Naimpally, Langhorne, Pa.

[73] Assignee: Matsushita Electric Corporation of America, Secaucus, N.J.

[21] Appl. No.: 743,856

[22] Filed: Aug. 12, 1991

Related U.S. Application Data

[63] Continuation-in-part of Ser. No. 643,756, Jan. 22, 1991.

[51] Int. Cl.$^5$ .................................................. H04N 7/087
[52] U.S. Cl. .................................... 358/141; 358/142; 358/147
[58] Field of Search ............... 358/142, 141, 146, 11, 358/12

[56] References Cited

U.S. PATENT DOCUMENTS 5,075,773  12/1991  Pullen et al. .................. 358/141

FOREIGN PATENT DOCUMENTS 0007054  5/1991  PCT Int'l Appl. .

Primary Examiner—James J. Groody
Assistant Examiner—David E. Harvey
Attorney, Agent, or Firm—Amster, Rothstein & Ebenstein

[57] ABSTRACT

The black level of the NTSC portion of an EDTV broadcast signal is set to a level N, typically twice as high as the normal 7.5 IRE units. This signal characteristic motivates the viewer or the automatic black level circuits of the NTSC receiver to raise the receiver's black level to about the same N IRE units for optimum reception of the transmitted signal. EDTV enhancement signals are transmitted in the range of +N to −N (for example, +15 to −15) IRE units. Since the NTSC receiver is adjusted to blank all signals below N IRE, the EDTV enhancement signals between +N and −N IRE levels do not trigger the display in the NTSC receiver, thereby maintaining the upper and lower band areas at a uniform black level without unwarranted speckles or other interference.

3 Claims, 5 Drawing Sheets

METHOD AND APPARATUS FOR TRANSMISSION OF SIGNALS FOR AN EXTENDED DEFINITION TELEVISION SYSTEM

CROSS REFERENCE TO RELATED APPLICATION

This application is a continuation in part of copending application Ser. No. 07/643,756, filed Jan. 22, 1991.

BACKGROUND OF THE INVENTION

This invention relates to a method and apparatus for transmitting signals for an Extended Definition Television System (EDTV) for reception on standard NTSC television receivers with minimal interference from the enhancement portion of the EDTV signal. The described EDTV video transmissions are imaged in letter box format when received by a typical NTSC television receiver.

The current operating standard for television transmissions in the United States is defined by the National Television Systems Committee (NTSC). This standard was approved for monochrome transmission by the Federal Communications Commission in 1941 and further expanded for NTSC color television systems in 1954.

Newer systems associated with High Definition Television (HDTV) set higher standards of resolution for the transmission of television images as compared to the NTSC standard. While the HDTV standard will deliver a better TV image, the transmission of this HDTV image is generally incompatible with existing NTSC receivers. Therefore, a migration path to transition to this better quality HDTV image in the face of the large existing installed base of incompatible NTSC receivers has to be found. It is clearly desirable to transition from the NTSC system to the HDTV system in a smooth, gradual way where an intermediate standard compatible with both the NTSC and the HDTV systems allows use of the existing NTSC receivers while concurrently providing some the benefits of the higher image quality of the HDTV transmissions.

Such a system, designed as an intermediate step to minimize the impact of the transition to HDTV, is generally identified as a "letter box" Extended Definition Television (EDTV). A letter box type EDTV transmission presents an image on a standard NTSC receiver that contains the information related to the full width of the originally transmitted EDTV image and maintains the original 9 by 16 aspect ratio of the EDTV image. To fit the 9 by 16 aspect ratio EDTV image into the 3 by 4 aspect ratio of the NTSC display requires the introduction of top and bottom bands in the display. The EDTV transmission reproduced by the NTSC receiver must therefore accommodate these bands.

The bands are ideally black and uniform, and appear above and below the active image area displayed by the NTSC-only compatible receiver. Geometric considerations of displaying a 9 by 16 ratio image into a 3 by 4 aspect ratio display dictate that 180 lines per field be used by the NTSC receiver to display the EDTV image. Since the NTSC has a total of 240 display lines, the 60 remaining lines are divided into two groups, with 30 lines forming the upper band and 30 lines forming the lower band. It is important that these bands be uniform and non-changing so as not to interfere with viewing the 180 line EDTV image on the NTSC display.

The letterbox EDTV system generally transmits the added, or enhancement information required by the full EDTV image within the time associated with the top and bottom band areas around the NTSC image just before and after the transmission of the NTSC compatible portion of the image. Such letter box type system have been described for example by Norihiro Suzuki et al. in "Experimental Hardware for Proposed Letter Box Wide Aspect EDTV", SMPTE Technical Conference, October 1990, New York City, N.Y. and W. F. Schreiber et al., "Single Channel HDTV System, Compatible and Non-compatible", presented at the 2nd HDTV workshop, Italy, March 1988, as well as Y. Kanatsugu et al., "Development of MUSE Family Systems", IEEE Transactions of Consumer Electronics, Vol. 35, No. 3, August 1989, pp. 153-158.

In a typical letterbox EDTV system, the EDTV video source signal originally contains 480 lines of video information per frame, split into two components. The first, or low pass (NTSC component) signal contains 360 video lines per frame (180 lines per field). The second, or high pass (EDTV enhancement) signal portion contains 120 video lines per frame (60 lines per field) plus blanking (22.5 lines per field).

A problem exists when the EDTV signal is viewed on an NTSC only receiver. The EDTV related information present in high pass components (i.e., the top and bottom bands containing the information necessary to enhance the quality of the EDTV image) can occasionally modulate the display lines of the bands in the NTSC receiver so that the bands are non-uniform in appearance. This modulation can produce, in the band areas of the NTSC receiver, speckles or wavy lines that detract from the enjoyment of the NTSC image and interfere with the quality of the NTSC image displayed on the NTSC receiver.

The undesirability of having the NTSC receiver display even faintly visible marks in the top and bottom band areas has led to proposals for systems to "blank" those areas. For example, in the system described in "Matrix Conversion for Improvement of Vertical-Temporal Resolution in Letter Box Wide-Aspect TV" by N. Suzuki at SMPTE Journal, February 1991, the amplitude of the output of the high pass filter from the video transmitter is compressed to limit the dynamic range of the high frequency signals and therefore reduce the visibility of the modulation of the bars.

Another system for reducing the interference associated with the top and bottom bands is described in "Transmission Method of Side-Panel Signals—A Technique to Hide Side-Panel Signals" by Ashibe et al. of the NEC Corporation, Japan, which proposes to split the high pass information normally associated with the bands into a high and a low energy group. The low energy group is transmitted during the duration of the bands while the high energy group is transmitted during the normal overscan period of the NTSC receiver when the beam forming the image is not visible on the display of the receiver. This allocation of the high energy group signals at a time when the display is not produced reduces the probability that some of the EDTV enhancement signal may inadvertently modulate the NTSC receiver during the top or bottom band forming period.

In view of the present limitations associated with EDTV television systems, it is an objective of the present invention to provide an EDTV letter box system whose transmission of EDTV signals is such that when viewed on an NTSC receiver, the upper and lower bands have a uniform appearance unmarred by the unwanted display of enhancements related to the EDTV image.

SUMMARY OF THE INVENTION

A system for transmitting an enhanced television signal for reception by standard NTSC receivers is described. The system can transmit two types of encoded signals during separate times, or portions, of a television image field. The first type of encoded signal contains information for providing an enhanced television image (the EDTV enhancement). The level for transmitting this first signal is chosen so as not to exceed a transmitted peak-to-peak value of between +N and −N, where N can be, for example, 15 IRE units. The second type of encoded signal contains information associated with the NTSC compatible signal. This signal has a level which is transmitted at an amplitude above N (e.g. 15 IRE units). The two types of signals are combined into a single signal suitable for transmission to EDTV as well as NTSC television receivers. In the NTSC receiver, the NTSC compatible signal is viewed with a black level set at or above N IRE units. Since the EDTV enhancement signal is at or below N IRE units, the NTSC receiver will not respond to the EDTV enhancements and therefore the upper and lower bands will appear uniformly black.

DESCRIPTION OF THE DRAWINGS

Features of the invention which are believed to be novel are set forth with particularity in the appended claims. The invention itself, however, together with its further objects and advantages thereof, may best be understood by reference to the following description, when taken in conjunction with the accompanying drawings, in which:

DESCRIPTION OF THE PREFERRED EMBODIMENT

Figure 1:
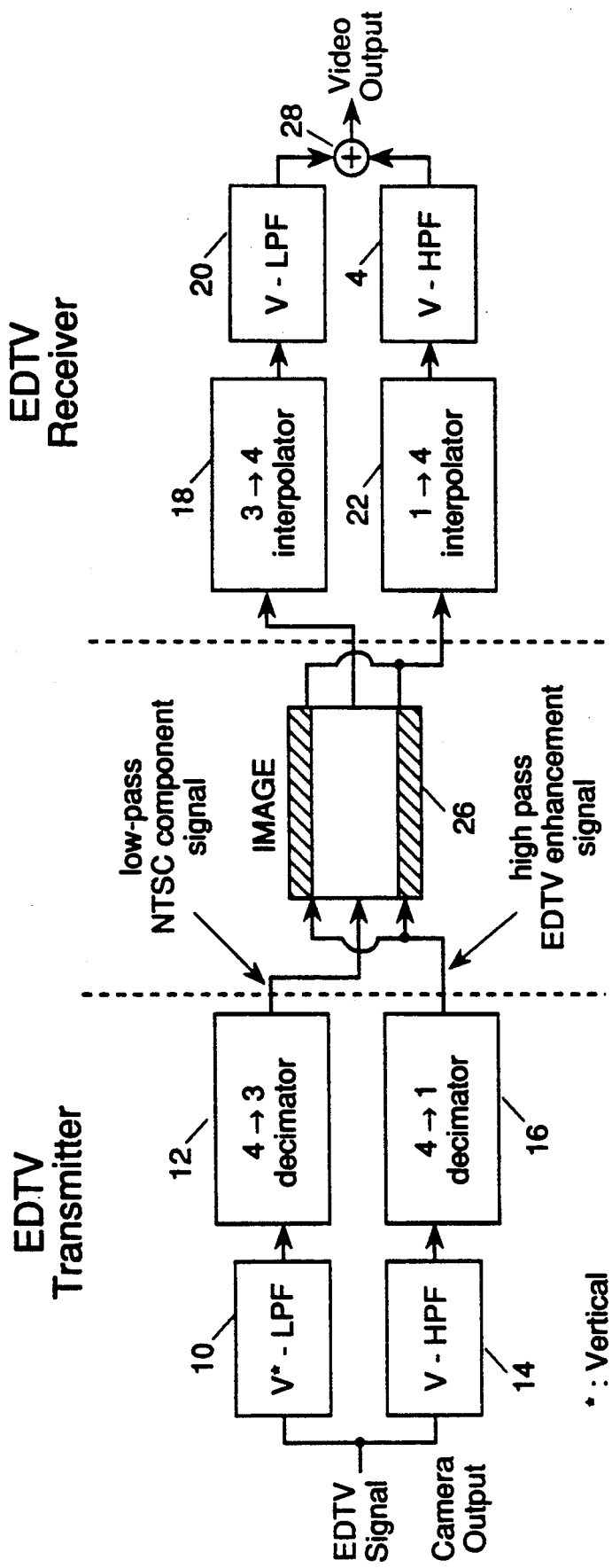
FIG. 1 shows a conventional EDTV transmitter in which the EDTV signal is separated into a low pass (NTSC component) signal and high pass (EDTV enhancement) signal and an EDTV receiver for receiving the EDTV signal.

FIG. 1 shows a well-known EDTV transmitter and receiver in which the original EDTV signal from the EDTV camera is divided into a low pass and a high pass component. Specifically, vertical low pass filter 10 extracts the signal that will, in the NTSC receiver, display the 180 line NTSC component of the EDTV signal. The output from filter 10 is passed through decimator 12 where the information contained in every 4 lines is reduced to 3 lines, i.e., decimation of 25%. The result is a 180 line low pass (NTSC component) signal. The remaining EDTV enhanced component of the EDTV signal is extracted by high pass filter 14 and decimator 16 where a 4 to 1 reduction of the image data is achieved to produce the high pass (EDTV enhancement) signal. This EDTV enhancement portion of the EDTV signal typically contains the information necessary to expand the standard NTSC image to the full EDTV image. The information from decimator 12 and decimator 16 are suitably combined and transmitted to form the equivalent image 26 made up of two distinct portions: the central NTSC portion, derived from low pass filter 10 and upper and lower bands derived from high pass filter 14.

This two portion television image thus derived is transmitted for reception for two kinds of receivers. In the first kind, an EDTV receiver shown in FIG. 1, interpolator 18 recreates the original low pass filter image that was compressed (or decimated) by decimator 12 in the transmitter, while interpolator 22 reconstructs the high frequency (or enhancement) part of the image. The signals from interpolators 18 and 22 are low and high pass filtered respectively in low pass filter 20 and high pass filter 24, and summed in summer 28 to reproduce the originally transmitted EDTV image on the display. In contrast, the standard NTSC receiver is not equipped with the interpolators or filters for Processing the entire EDTV signal. Rather the NTSC receiver is only meant to detect the 180 line NTSC component of the EDTV signal and produce blank black areas above and below the NTSC image. It is desirable for the NTSC receiver not to inadvertently display any EDTV enhancement so as to maintain the black areas uniformly black.

Figure 2:
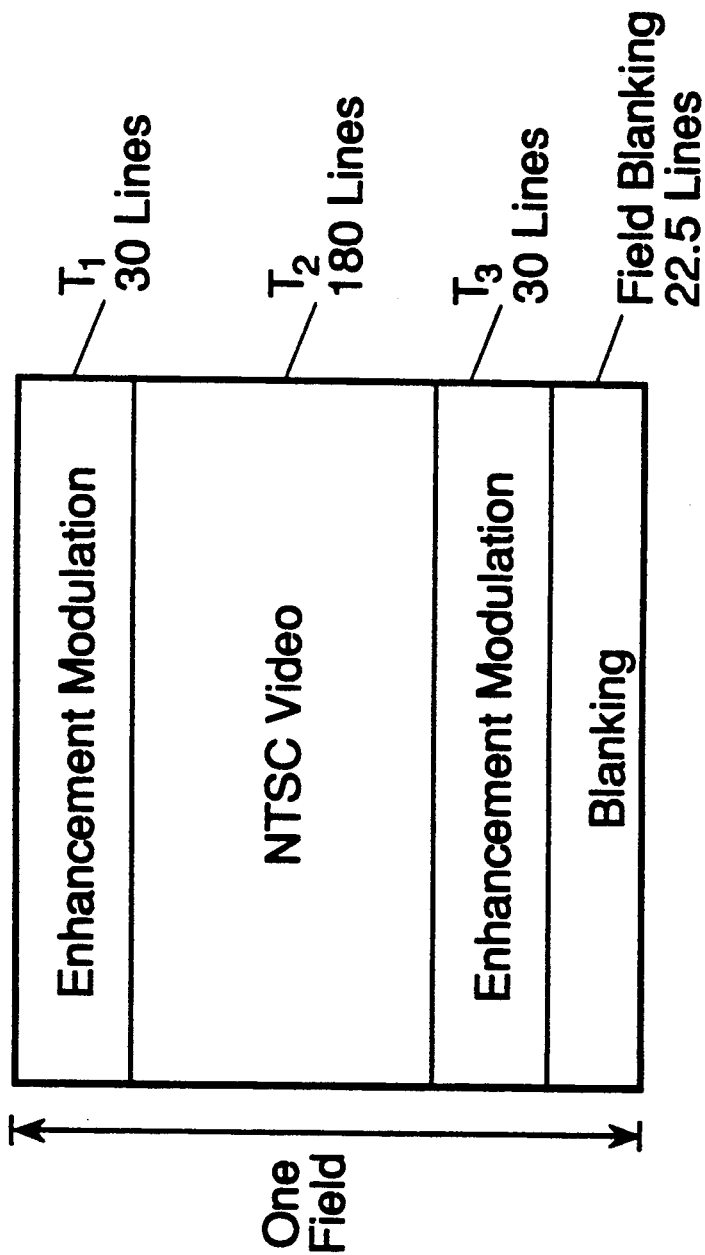
FIG. 2 shows one field of an EDTV transmission displayed by an NTSC receiver where the EDTV enhancement component is transmitted in the 30 lines before and after the 180 lines associated with the NTSC component of the EDTV signal.

FIG. 2 illustrates the allocation of 262.5 lines of an NTSC video field as generated by the EDTV transmitter of FIG. 1. Times T1 and T3, each having 30 lines, represent the time allocated for the black bands above and below the 180 line NTSC image. T1 and T3 represent the times during which the high pass signal for EDTV image enhancements is received. Some of the 22.5 lines allocated for blanking may also be used for the same purpose. Time T2 denotes the time during which the NTSC image is reproduced, i.e., the "low pass" portion the EDTV signal. The NTSC receiver has the capability of displaying information during times T1 and T3 if the signal during those times is above the black level set at the receiver. These are also the times during which the EDTV component is present and during which it is desirable to have the display be uniformly black. Use of the present invention, precludes, during times T1 and T3, the inadvertent display by the NTSC receiver of any portion of the EDTV enhancement signal.

Typically, NTSC video signals are transmitted with white information set to 100 IRE units, and blanking information set at 0 IRE units. The horizontal synchronization pulse is set at −40 IRE units and the black level is set nominally at typically +7.5 IRE units. Therefore, when an NTSC receiver is set to cut off its display electron beam for 7.5 IRE units (i.e., black level of 7.5 IRE units) any signal below this level of 7.5 IRE will be blanked and not displayed.

In accordance with this invention, the EDTV enhancement signal is transmitted at a level of between +N and −N IRE units. By choosing to transmit the black level of the NTSC compatible portion of the EDTV signal at N IRE units, and the EDTV enhancement portion in the range of +N to −N IRE units, the NTSC receiver is adjusted to blank all signals below N IRE units. The EDTV enhancement portion, which is between +N and −N IRE units, will not trigger the display in the NTSC receiver. Preferably, the transmitted black level of the NTSC component will be higher than the usual black level, for example, 15 IRE units, to ensure proper reception of the EDTV enhancement signal. This higher black level would motivate the viewer, or the automatic black level circuits of the NTSC receiver, to raise the receiver's black level to about the same N IRE units for optimum reception and viewing of the transmitted signal.

Figure 3:
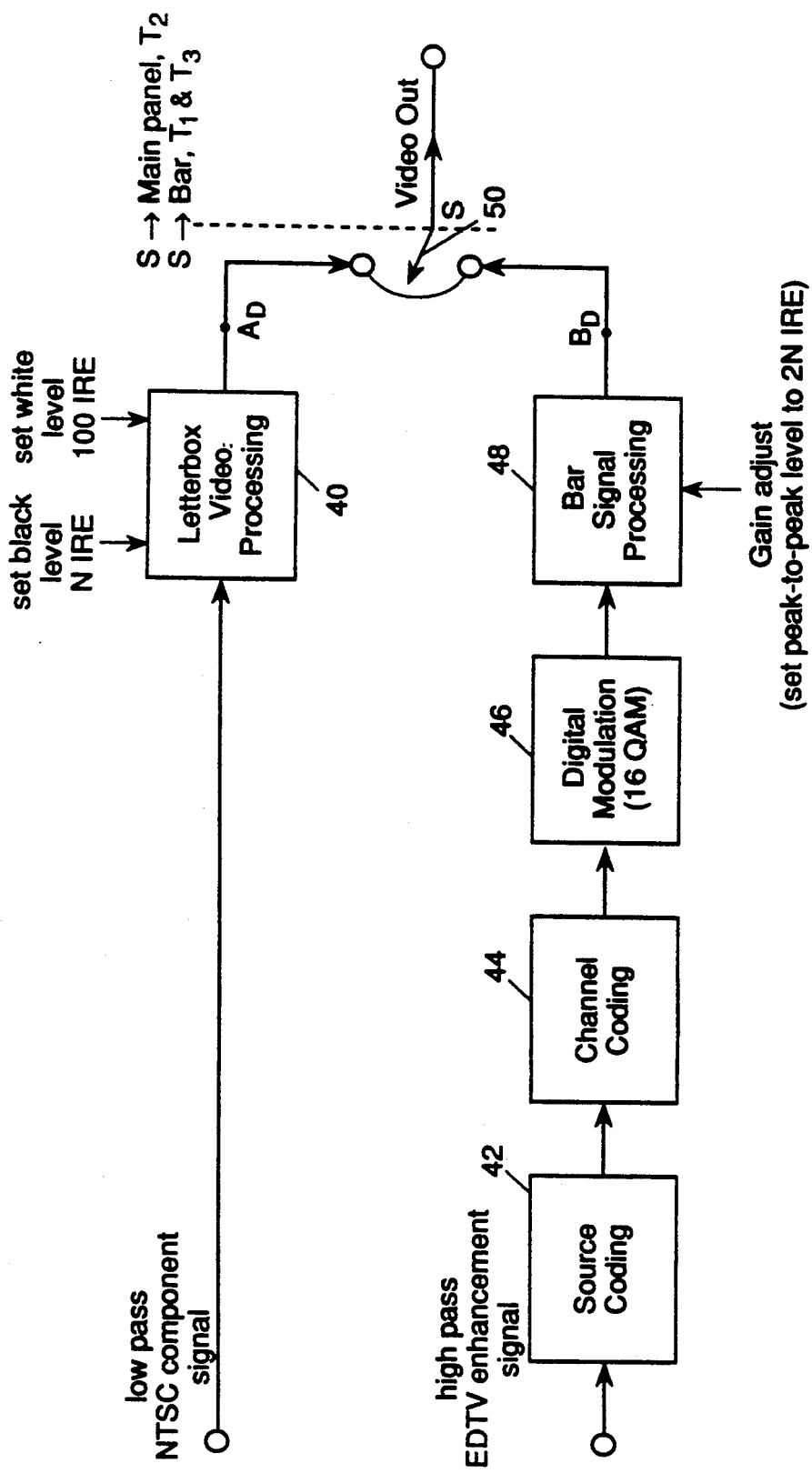
FIG. 3 shows a transmitter for the present invention where the information associated with the high pass (EDTV component) signal is processed digitally.
Figure 5:
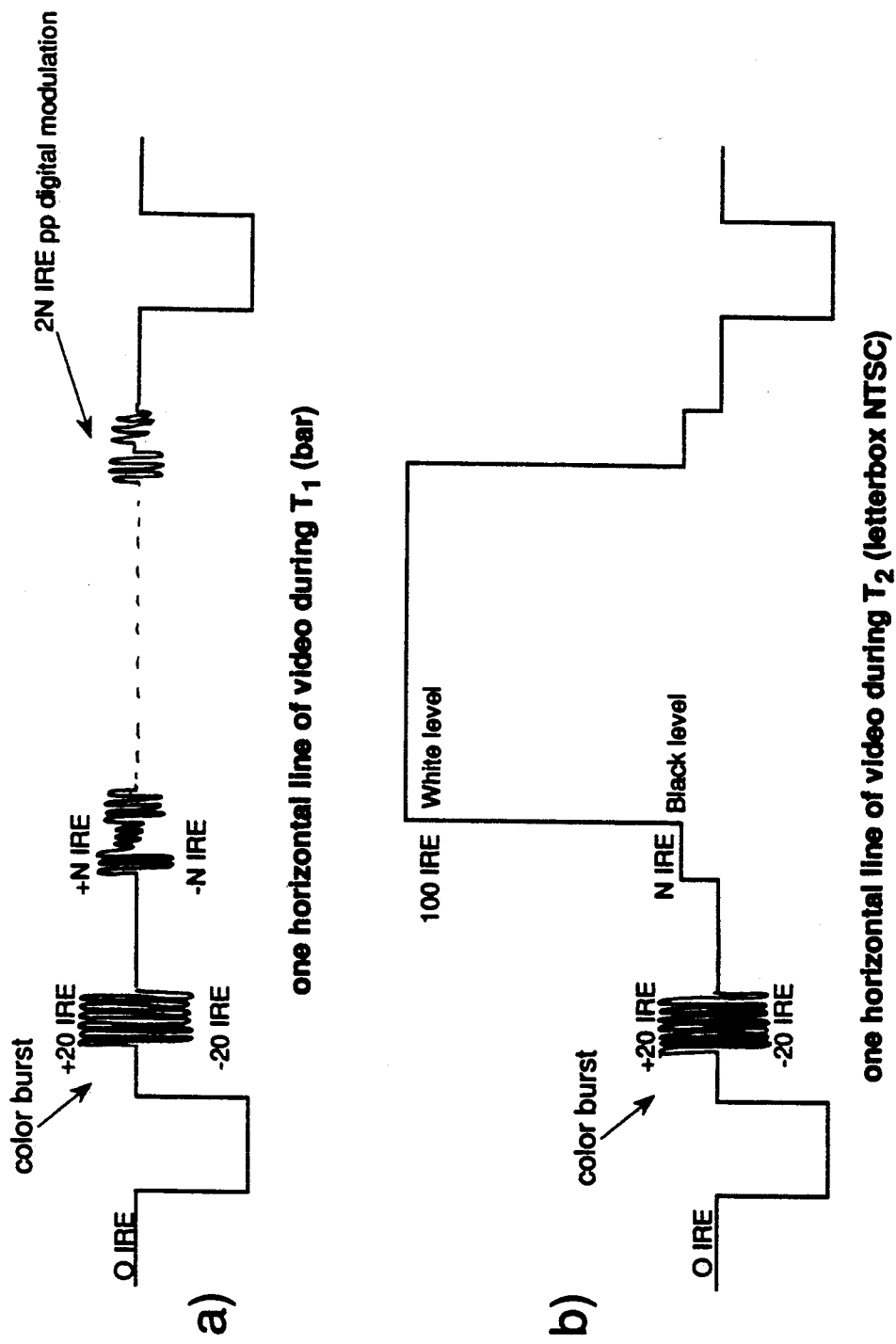
FIG. 5 shows waveforms useful to explain the operation of the present invention.

Referring to FIGS. 3 and 5, an EDTV transmission system in accordance with the invention is described wherein the high pass (EDTV enhancement) signal is digitally processed. FIG. 5 represents the actual broadcast video levels of the waveforms associated with the present invention. The low pass (NTSC component) signal (FIG. 5b) which would be produced by a decimator, such as decimator 12 of FIG. 1, is applied to a letterbox video processing circuit 40 which is a conventional gain setting device, where the black level for the signal is set to N IRE and the white level is set to approximately 100 IRE units, with N typically 15 IRE. The high pass (EDTV enhancement) signal (FIG. 5(a)) which would be produced by a decimator, such as decimator 16 of FIG. 1, is applied to a source coding circuit 42, a channel coding circuit 44 and a digital modulator (16 QAM) circuit 46. Source coding circuit 42, channel coding circuit 44 and digital modulator circuit 46 are described in more detail in my corresponding co-pending application Ser. No. 07/643,757, filed Jan. 22, 1991, which is expressly incorporated herein by reference. The output of digital modulator 46 is applied to bar signal processor 48, which is a gain setting device well known in the art, in which the peak-to-peak signal level of the EDTV enhancement component is set to 2 N IRE units peak-to-peak. The outputs from letterbox video processing circuit 40 and bar signal processor 48 are applied to combiner 50 illustrated as a switch, the output of which is the EDTV video output signal.

Figure 4:
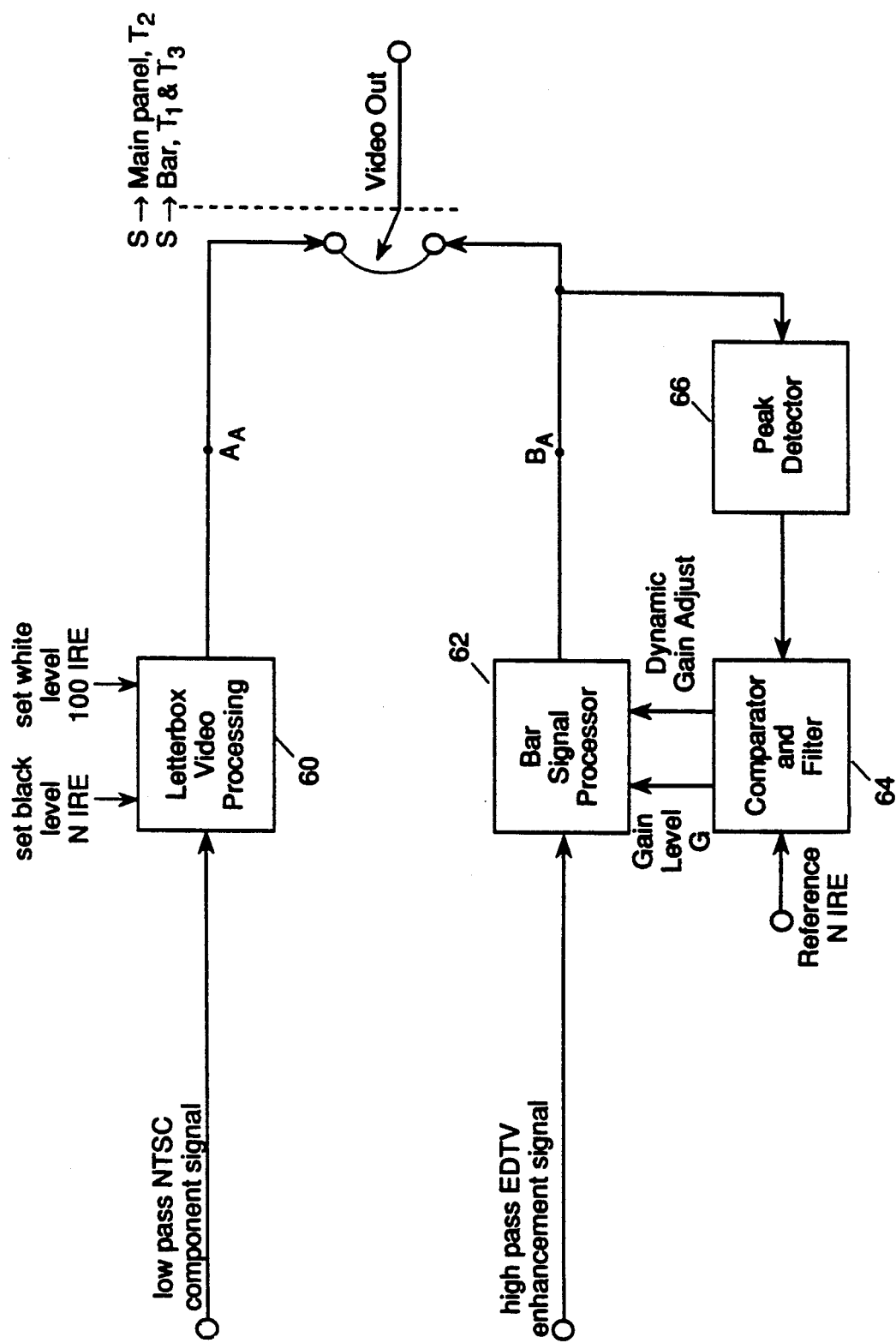
FIG. 4 shows a transmitter for the present invention where the information associated with the high pass (EDTV component) signal is processed in analog fashion.

FIG. 4 shows an EDTV system wherein the high pass (EDTV component) of the EDTV signal is processed in an analog manner. As in FIG. 3, the low pass (NTSC component) signal is applied to a letterbox video processing gain setting device 60, where the black level is set to N IRE units while the white level is set to about 100 IRE units. Again N is typically 15 IRE units. The high pass (EDTV enhancement) signal is applied to bar signal processor 62, which also receives input from comparator and filter 64 controlled by peak detector 66. In operation, the output level of the EDTV enhancement signal from bar signal processor 62 is maintained at a peak-to-peak level between +N and −N by sensing the bar signal processor output signal level $B_A$ in peak detector 66, comparing that level to a reference N IRE level in comparator and filter 64 and adjusting the gain of bar signal processor 62 to maintain the desired +N to −N peak-to-peak signal. Bar signal processor 62, comparator and filter 64, and peak detector 66 are well known in the art.

Although the present invention has been shown and described with respect to the presently preferred embodiments, various changes and modifications which are obvious to persons skilled in the art of which the invention pertains are deemed to lie within the spirit and scope of the invention. For example, the quantity N can be chosen over a wide range, not limited to 15 IRE units. Thus numerous changes and modifications can be made while staying within the scope of the invention which is set forth in the appended claims.

I claim:

1. A system for transmitting an enhanced television signal for reception by standard NTSC receivers comprising:

means for forming a first signal during a portion of a television image filed containing information for providing an enhanced television image;

means for controlling the level of said first signal so that said first signal does not exceed a peak-to-peak value of between +N and −N IRE units, and wherein N is an integer greater than zero;

means for forming an NTSC compatible signal having a black level at +N IRE during another portion of said television image field while maintaining the video clamp level at zero IRE; and means for combining said first signal and said NTSC compatible signal into a signal suitable for transmission for reception by television receivers.

2. The system for transmitting an enhanced television signal of claim 1 wherein N is set at 15 IRE.

3. A method for transmitting an enhanced television signal for reception by standard NTSC receivers comprising the steps of:

forming encoded signals during a portion of a television image field, said encoded signals containing information for providing an enhanced television image;

controlling the amplitude level of said encoded signals to maintain a peak-to-peak value of +N and −N IRE, where N is an integer greater than zero;

forming an NTSC signal having a black level during another portion of said television image field;

setting the black level of said NTSC signal to a value equal to or higher than +N IRE while maintaining the video clamp level at zero IRE; and combining said encoded signals and said NTSC signals into a television signal suitable for transmission to television receivers.

* * * * *